United States Patent
Montana et al.

(10) Patent No.: US 9,524,583 B2
(45) Date of Patent: Dec. 20, 2016

(54) SIMULATION OF THE MACHINING OF A WORKPIECE

(71) Applicant: Dassault Systemes, Velizy Villacoublay (FR)

(72) Inventors: Nicolas Montana, Aix-en-Provence (FR); Marc Monteil, Rognac (FR); Romain Nosenzo, Aix-en-Provence (FR); Andre Lieutier, Puyricard (FR)

(73) Assignee: Dassault Systemes, Velizy Villacoublay (FR)

( * ) Notice: Subject to any disclaimer, the term of this patent is extended or adjusted under 35 U.S.C. 154(b) by 196 days.

(21) Appl. No.: 13/666,558

(22) Filed: Nov. 1, 2012

(65) Prior Publication Data

US 2013/0116990 A1    May 9, 2013

(30) Foreign Application Priority Data

Nov. 3, 2011   (EP) .................................... 11306423

(51) Int. Cl.
*G06F 7/48*     (2006.01)
*G06T 19/00*    (2011.01)
*G05B 19/4069*  (2006.01)

(52) U.S. Cl.
CPC ........... *G06T 19/00* (2013.01); *G05B 19/4069* (2013.01); *G06T 2210/04* (2013.01)

(58) Field of Classification Search
CPC ................. G05B 19/4097; G05B 2219/35148; G05B 19/4069; G05B 19/4061; G05B 19/40937; G05B 2219/35009; G05B 2219/35287; G05B 19/19; G05B 19/4099; G05B 19/41; G05B 19/4163; G05B 19/4166; G05B 2219/34135

(Continued)

(56) References Cited

U.S. PATENT DOCUMENTS 4,833,617 A * 5/1989 Wang ............................ 700/173
5,710,709 A   1/1998 Oliver et al.
(Continued)

FOREIGN PATENT DOCUMENTS

WO   WO 2010/082378 A1   7/2010
WO   WO 2011/042764 A1   4/2011

OTHER PUBLICATIONS

Albert, M., An Overview of 3 + 2 Machining, Oct. 4, 2006 http://www.mmsonline.com/articles/an-overview-of-3-2-machining.*

(Continued)

*Primary Examiner* — Aniss Chad
*Assistant Examiner* — Scott S Cook
(74) *Attorney, Agent, or Firm* — Hamilton, Brook, Smith & Reynolds, P.C.

(57) ABSTRACT

It is provided a computer-implemented method for simulating the machining of a workpiece with a cutting tool having a cutting part and a non-cutting part. The method comprises providing a modeled volume representing the workpiece and a trajectory of the cutting tool; determining a colliding sweep of the cutting tool, wherein the colliding sweep represents the volume swept by the non-cutting front of the cutting tool when the cutting tool follows the trajectory; testing a collision with the workpiece according to the determining step. Such a method improves the simulation of the machining of a workpiece with a cutting tool.

17 Claims, 6 Drawing Sheets

(58) Field of Classification Search
USPC ........ 703/1, 6, 7; 700/95–98, 108–110, 159, 700/160, 174–185
See application file for complete search history.

(56) References Cited

U.S. PATENT DOCUMENTS

| | | | |
|---|---|---|---|
| 6,311,100 B1* | 10/2001 | Sarma ................ | G05B 19/4097 700/186 |
| 7,747,418 B2 | 6/2010 | Leu et al. | |
| 7,832,968 B2* | 11/2010 | Glaesser ...................... | 409/132 |
| 8,538,574 B2* | 9/2013 | Hahn ........................... | 700/159 |
| 9,117,300 B2 | 8/2015 | Montana et al. | |
| 2001/0048857 A1* | 12/2001 | Koch ............................ | 409/132 |
| 2002/0133264 A1* | 9/2002 | Maiteh et al. ................ | 700/182 |
| 2003/0083773 A1* | 5/2003 | Schwanecke ...... | G05B 19/4069 700/182 |
| 2005/0113963 A1* | 5/2005 | Cho et al. ..................... | 700/188 |
| 2006/0094951 A1* | 5/2006 | Dean .................. | A61F 2/30942 600/407 |
| 2009/0148251 A1* | 6/2009 | Glasser et al. ................ | 409/132 |
| 2010/0298967 A1* | 11/2010 | Frisken et al. ................ | 700/173 |
| 2012/0089247 A1* | 4/2012 | Kawauchi et al. ........... | 700/178 |
| 2012/0221300 A1 | 8/2012 | Tukora | |
| 2012/0330620 A1* | 12/2012 | Sullivan ............. | G05B 19/4069 703/1 |
| 2013/0030781 A1* | 1/2013 | Yoneda .............. | G05B 19/4069 703/6 |
| 2013/0116983 A1 | 5/2013 | Montana et al. | |
| 2013/0116984 A1 | 5/2013 | Montana et al. | |
| 2016/0188770 A1 | 6/2016 | Montana et al. | |

OTHER PUBLICATIONS

Hopkins, B., Benefits of Positional Five-Axis Machining, May 1, 2007 http://www.moldmakingtechnology.com/articles/benefits-of-positional-five-axis-machining.*

MoldMaking, Five-Axis CAD/CAM Integration Helps Optimize Moldmaker's Machine Utilization, Apr. 1, 2011, http://www.moldmakingtechnology.com/articles/five-axis-cadcam-integration-helps-optimize-moldmakers-machine-utilization.*

Kadir, A.A., Virtual Machine Tools and Virtual Machining—A Technical Review, Robotics and Computer-Integrated Manufacturing 27, Oct. 27, 2010.*

Peng, X., 3 Interactive Solild Modelling in a Virtual Environment with Haptic Interface, Virtual and Augmented Reality Applications in Manufacturing, Springer-Verlag London 2004.*

Wang, W.P., Geometric Modeling for Swept Volume of Moving Solids, IEEE, 1986.*

Van Hook, T., Real-Time Shaded NC Milling Display, SIGGRAPH 1986, vol. 20, No. 4, 1986.*

Zalewski, M., Guerrilla Guide to CNC Machining, vol. I: Basic Theory and Preparations, http://diyhpl.us/~bryan/papers2/guerrilla_cnc1.html.*

Wright (Tool Path Generation for Finish Machining of Freeform Surfaces in the Cybercut Process Planning Pipeline, LMAS UC Berkeley, 2007).*

OpenGL GUI, Archived Wiki definition dated Jul. 27, 2010 http://web.archive.org/web/20100727160446/http://gigi.sourceforge.net/.*

Lee (Complete swept volume generation, Part I: Swept volume of a piecewise C1-continuous cutter at fiv—axis milling via Gauss map).*

König et al., "Real Time Simulation and Visualization of NC Milling Processes for Inhomogeneous Materials on Low-End Graphics Hardware", http://user.engineering.uiowa.edu/-amalek/sweep/, 1999, 15 pages.

"ATI Stream Computing OpenCL™ Programming Guide," ATI Stream Computing Programming Guide, Advanced Micro Devices, Inc., *p. 4-37*, Jun. 1, 2010.

Hook, T.V., "Real-Time Shaded NC Milling Display," *Computer Graphics, ACM,* 20(4): 15-18 (Aug. 18, 1986).

Huang, Yunching et al., "NC Milling Error Assessment and Tool Path Correction," *Proceedings of the 21st Annual Conference on Computer Graphics and Interactive Techniques,* 1994.

Ilushin, O. et al., "Precise Global Collision Detection IN Multi-Axis NC-Machining," *Computer-Aided Design,* 37: 909-920 (2005).

Jimenez, P. et al., "3D Collision Detection: A Survey," *Computer & Graphics,* 25(2): 269-285 (Apr. 1, 2001).

König, A. H. et al., "Real Time Simulation and Visualization of NC Milling Processes for Inhomogeneous Materials on Low-End Graphics Hardware," IEEE Proceedings, Hannover, Germany, pp. 338-349 (Jun. 22-26, 1998).

Liu, S.Q. et al., "Real-Time, Dynamic Level-of-Detail Management for Three-Axis NC Milling Simulation," *Computer-Aided Design,* 38(4): 378-391 (Apr. 2006).

Mayr, H. et al., "A Solid Modeler for Dynamic Objects Using the Dexel Representation," *Proceeding of ICED '91, International Conference on Engineering Design,* Zurich, Switzerland, pp. 1082-1085 (Aug. 27, 1991).

Muller, H. et al., "Online Sculpting and Visualization of Multi-Dexel Volumes," *SM '03 Proceedings of the 8th ACM Symposium on Solid Modeling and Applications.*

Peng, X. et al., "A Virtual Sculpting System Based on Triple Dexel Models with Haptics," *Computer-Aided Design and Applications,* 6(5): 645-659 (Jan. 1, 2009).

Ren, Y. et al., "Virtual Prototyping and Manufacturing Planning by Using Tri-Dexel Models and Haptic Force Feedback," *Virtual and Physical Prototyping,* 1(1): 3-18 (Mar. 2006).

Stifter, S., "Simulation of NC Machining Based on the Dexel Model: A Critical Analysis," *Int. J. Adv. Manuf. Technol.,* 10: 149-157 (1995).

Tang, T.D. et al., "The Sweep Plane Algorithm for Global Collision Detection with Workpiece Geometry Update for Five-Axis NC Machining," *Computer Aided Design,* 39: 1012-1024 (2007).

Tukora, B. et al., "Fully GPU-based Volume Representation and Material Removal Simulation of Free-Form Objects," *Innovative Developments in Design and Manufacturing Advanced Research in Virtual and Rapid Prototyping—Proceedings of VR,* pp. 609-614 (Jan. 1, 2009).

Tukora, B. et al., "GPGPU-Based Material Removal Simulation and Cutting Force Estimation," *Proceedings of the Seventh International Conference on Engineering Computational Technology,* (1994).

Tukora, B. et al., "Multi-Dexel based Material Removal Simulation and Cutting Force Prediction with the Use of General-Purpose Graphics Processing Units," *Advances in Engineering Software,* 43(1): 65-70 (Aug. 16, 2011).

Wang, C.L. et al., "Layered Depth-Normal Images: A Sparse Implicit Representation of Solid Models," *Proceedings of ASME International Design Engineering Technical Conferences,* Brooklyn, NY.

European Search Report for European Application No. EP 11 30 6422; Date of Completion of Search: May 11, 2012.

European Search Report for European Application No. EP 11 30 6423; Date of Completion of Search: Jun. 19, 2012.

European Search Report for European Application No. EP 11 30 6424; Date of Completion of Search: May 24, 2012.

Zhao, Hanli, et al. "Parallel and efficient Boolean on polygonal solids." The Visual Computer 27.6-8 (2011 ): 507-517.

Lagae, Ares, and Philip Dutre. "Time and space efficient grids for ray tracing." CW Reports (2007).

Van Den Bergen, G., "Efficient Collision Detection of Complex Deformable Models using AABB Trees," Dept. of Mathematics and Computing Science, Eindhoven University of Technology (Nov. 6, 1998).

Bouma, W. and Vanecek, G., "Collision detection and analysis in a physically based simulation", Proceedings Eurographics workshop on animation.

CAMWorks, http://www.camworks.com/modules/multiaxis-machining/.

(56) References Cited

OTHER PUBLICATIONS

Dautry, R. and Lions, J-L, "Mathematical Analysis and Numerical Methods for Science and Technology, vol. $, Intergral Equations and Numerical Methods," Springer, eds., pp. 173-240.
Gottschalk, S., et al., "OBBTree: A Hierarchical Structure for Rapid Interference Detection," Dept. of Computer Science, University of North Carolina http://www.cs.unc.edu/~geom/OBB/OBBT.html.
Hoffmann, C. M., "Geometric and Solid Modeling", San Mateo, California (1989).
http:/www.cs.tau.ac.il/~haimk/seminar09b/Lower Envelopes.pptx.
Lin, M. and Gottschalk, S., "Collision detection between geometric models: A survey", Proc. of IMA Conference on Mathematics of Surfaces, 20 pages (1998).
Open GL GUI, Archived Wiki definition dated Jul. 27, 2010. Retrieved from Internet URL: http://gigi.sourceforge.net.
Peternell, M. et al., "Swept Volumes", *Computer Aided Design & Applications,* 2(5): 599-608 (2005).
Qin, Zhang, et al., "Improvement of collision-detection algorithm based on OBB," J. Huazhong Univ. of Sci. & Tech. (Nature Science Edition) 31:1 (Jan. 2003).
Shewchuk, J. R., "Adaptive Precision Floating-Point Arithmetic and Fast Robust Predicates" Discrete & Computational Geometry, 18(3): 305-363 (Oct. 1997).
Su, C.-J. et al., "A new collision detection method for CSG-represented objects in virtual manufacturing," Computers in Industry, 40(1): 1-13 (Sep. 1999).

\* cited by examiner

SIMULATION OF THE MACHINING OF A WORKPIECE

RELATED APPLICATION

This application claims priority under 35 U.S.C. §119 or 365 to European Application No. 11306423.2, filed Nov. 3, 2011.

The entire teachings of the above application(s) are incorporated herein by reference.

FIELD OF THE INVENTION

The invention relates to the field of computer programs and systems, and more specifically to a method, system and program for simulating the machining of a workpiece with a cutting tool having a cutting part and a non-cutting part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such systems, the graphical user interface (GUI) plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Some of these systems allow the simulation of the machining of a workpiece with a cutting tool. However, these systems often lead to a deficient simulation.

Examples of such systems are provided in:
the paper entitled "Precise global collision detection in multi-axis NC-machining", Oleg Ilushina, Gershon Elberb, Dan Halperin, Ron Wein, Myung-Soo Kim, Computer-Aided Design 37 (2005) 909-920; and
the paper entitled "The sweep plane algorithm for global collision detection with workpiece geometry update for five-axis NC machining", T. D. Tang, Erik L. J. Bohez, Pisut Koomsap, Computer-Aided Design 39 (2007) 1012-1024.

Some systems allow the representation of a modeled volume with a set of dexels. Several documents notably suggest using dexel representation for machining simulation or interactive sculpting.

Examples of such documents are:
the paper entitled "A Virtual Sculpting System Based on Triple Dexel Models with Haptics", Xiaobo Peng and Weihan Zhang, Computer-Aided Design and Applications, 2009;
the paper entitled "NC Milling Error Assessment and Tool Path Correction", Yunching Huang and James H. Oliver, Proceedings of the 21st annual conference on Computer graphics and interactive techniques, 1994;
the paper entitled "NC milling simulation and dimensional verification via dexel representation", Oliver, J. H. and Huang, Y., U.S. Pat. No. 5,710,709—1998;
the paper entitled "Online Sculpting and Visualization of Multi-Dexel Volumes", Heinrich Muller, Tobias Surmann, Marc Stautner, Frank Albersmann, Klaus Weinert, SM '03 Proceedings of the eighth ACM symposium on Solid modeling and applications;
the paper entitled "Virtual prototyping and manufacturing planning by using tri-dexel models and haptic force feedback", Yongfu Ren, Susana K. Lai-Yuen and Yuan-Shin Lee, Virtual and Physical Prototyping, 2006;
the paper entitled "Simulation of NC machining based on the dexel model: A critical analysis", Sabine Stifter, The International Journal of Advanced Manufacturing Technology, 1995;
the paper entitled "Real time simulation and visualization of NC milling processes for inhomogeneous materials on low-end graphics hardware", Konig, A. H. and Groller, E., Computer Graphics International, 1998. Proceedings;
U.S. Pat. No. 5,710,709;
U.S. Pat. No. 7,747,418.

GPGPU (General-Purpose computing on Graphics Processing Units) is the technique of using a graphic processing unit (GPU) which typically handles computation only for computer graphics, to perform computation in applications traditionally handled by the central processing unit (CPU). Some papers consider using the computation power of modern graphics processing units (GPU) for dexel representation. These papers make use of the LDNI (Layered Depth-Normal Images) algorithm, which is associated to a specific memory model.

Examples of such papers are:
the paper entitled "GPGPU-based Material Removal Simulation and Cutting Force Estimation", B. Tukora and T. Szalay, CCP: 94: Proceedings Of The Seventh International Conference On Engineering Computational Technology;
the paper entitled "Layered Depth-Normal Images: a Sparse Implicit Representation of Solid Models", Charlie C. L. Wang and Yong Chen, Proceedings of ASME international design engineering technical conferences. Brooklyn (NY).

Within this context, there is still a need for an improved solution for simulating the machining of a workpiece with a cutting tool having a cutting part and a non-cutting part.

SUMMARY OF THE INVENTION

According to one aspect, it is therefore provided a computer-implemented method for simulating the machining of a workpiece with a cutting tool having a cutting part and a non-cutting part. The method comprises providing a modeled volume representing the workpiece and a trajectory of the cutting tool. The method also comprises determining a colliding sweep of the cutting tool. The colliding sweep represents the volume swept by the non-cutting front of the cutting tool when the cutting tool follows the trajectory. The method also comprises testing a collision with the workpiece according to the determining step.

The method may comprise one or more of the following:

the method comprises determining a protective front of the cutting tool, and determining the colliding sweep comprises determining the volume swept by the non-cutting part and the volume swept by the protective front;

the workpiece is represented by a set of dexels, each dexel comprising a set of at least one segment representing the intersection between a line and the workpiece, and testing the collision comprises, for a respective dexel: determining the segments of the respective dexel that intersect the volume swept by the protective front, updating the respective dexel accordingly, and evaluating if the segments of the respective dexel as updated intersect the volume swept by the non-cutting part;

the cutting part is convex, the segments of the respective dexel are ordered, and updating the respective dexel comprises: shortening the segment of minimal order that intersects the volume swept by the protective front, shortening the segment of maximal order that intersects the volume swept by the protective front, and removing all segments between the segment of minimal order and the segment of maximal order;

determining the colliding sweep comprises determining the volume swept by the non-cutting front of the cutting tool when the cutting tool follows the trajectory.

It is further proposed a CAM system comprising a memory having recorded thereon instructions for performing the above method, a processor coupled with the memory, and at least one graphical user interface coupled with the processor and suitable for execution of the instructions.

The processor may be a GPU (Graphical Processing Unit).

It is further proposed a computer program comprising instructions for performing the above method.

It is further proposed a computer readable storage medium having recorded thereon the above computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
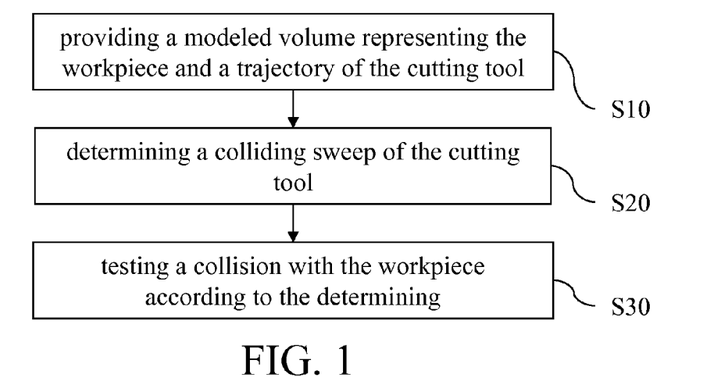
FIG. 1 shows a flowchart of an example of the method.

FIG. 1 shows a flowchart of an example of a computer-implemented method for simulating the machining of a workpiece with a cutting tool having a cutting part and a non-cutting part. The method comprises providing (S10) a modeled volume representing the workpiece and a trajectory of the cutting tool. The method also comprises determining (S20) a colliding sweep of the cutting tool. The colliding sweep represents the volume swept by the non-cutting front of the cutting tool when the cutting tool follows the trajectory. The method further comprises testing (S30) a collision with the workpiece according to the determining. Such a method improves the simulation of the machining of a workpiece with a cutting tool.

The method may be comprised in a process of designing a CAD modeled object representing a manufacturing object. The manufacturing object may be any physical product, and may be manufactured according to a machining process performed on a workpiece. For example, the manufacturing object may be obtained by machining a stock with a cutting tool. The workpiece consists of the stock as it stands during the machining The method simulates such machining "Designing a CAD modeled object" designates any action or series of actions which is at least part of a process of elaborating a modeled object. For example, the method may comprise providing a modeled volume representing the workpiece as a stock, and simulating the machining of the workpiece by simulating the cutting of the modeled volume (thus simulating the cutting of the stock). The modeled volume defines a 3D space occupied by the workpiece. Thus, the modeled volume is a modeled solid. Because the method improves simulation of the machining of a workpiece with a cutting tool having a cutting part and a non-cutting part, the method also improves the design of a CAD modeled object representing a manufacturing object.

A modeled object is any object defined by data stored in a memory of a computer system. By extension, the expression "modeled object" designates the data itself. A CAD modeled object is any object defined by data stored in a memory of a CAD system. According to the type of the system, the modeled objects may be defined by different kinds of data. A CAD system is any system suitable at least for designing a modeled object on the basis of a graphical representation of the modeled object, such as CATIA. Thus, the data defining a CAD modeled object comprise data allowing the representation of the modeled object (e.g. geometric data, for example including relative positions in space).

The method may be included in a manufacturing process, which may comprise, after performing the method, producing a manufacturing object according to the machining process simulated by the method. In other words, after the testing (S30), e.g. if the testing (S30) yields the result that there is no collision, the method may comprise actually cutting a workpiece (represented by the modeled volume) with a cutting tool according to the trajectory. The manufacturing object may be a product, such as a part, or an assembly of parts. Because the method improves the design of the modeled volume, the method also improves the manufacturing of a product and thus increases productivity of the manufacturing process. The method can be implemented using a CAM system, such as DELMIA. A CAM system is any system suitable at least for defining, simulating and controlling manufacturing processes and operations.

The method is computer-implemented. This means that the method is executed on at least one computer, or any system alike. Unless mentioned otherwise, all steps of the method are performed by the computer, i.e. without intervention of the user. For example, the steps of determining (S20) and testing (S30) may be performed by the sole computer, whereas the step of providing (S10) may be performed by the sole computer or through user-interaction. The method thereby allows an automatic testing of a machining A typical example of computer-implementation of the method is to perform the method with a system suitable for this purpose. The system may comprise a memory having recorded thereon instructions for performing the method. In other words, software is already ready on the memory for immediate use. The system is thus suitable for performing the method without installing any other software. Such a system may also comprise at least one processor coupled with the memory for executing the instructions. In other words, the system comprises instructions coded on a memory coupled to the processor, the instructions providing means for performing the method. Such a system is an efficient tool for designing a modeled volume.

Such a system may be a CAD or CAM system. The system may also be a CAE system, and the modeled object may also be a CAE modeled object and/or a CAM modeled object. Indeed, CAD, CAE and CAM systems are not exclusive one of the other, as a modeled object may be defined by data corresponding to any combination of these systems.

The system may comprise at least one GUI for launching execution of the instructions, for example by the user. Notably, the GUI may allow the user to launch the step of providing (S10), by designing the modeled volume and/or defining the trajectory of the cutting tool from scratch, and/or by retrieving the modeled volume and/or the trajectory of the cutting tool from a memory of the system, or exterior to the system but coupled to the system, e.g. by a network service. The GUI may comprise a GPU. In such a case, the processor may be the GPU. In other words, the processor executing at least steps of the method, in particular the steps of determining (S20) and/or testing (S30), may be the GPU. Such a system is an efficient tool for designing a modeled volume by a user. This is particularly advantageous when the modeled volume is provided as a set of dexels. Since dexel based algorithms are well suited for massively parallel hardware, it is natural to consider using the computation power of modern graphic processing unit (GPU).

The modeled volume may be 3D (i.e. three-dimensional). This means that the modeled volume is defined by data allowing its 3D representation. A 3D representation allows the viewing of the represented volume from all angles. For example, the modeled volume, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

Figure 2:
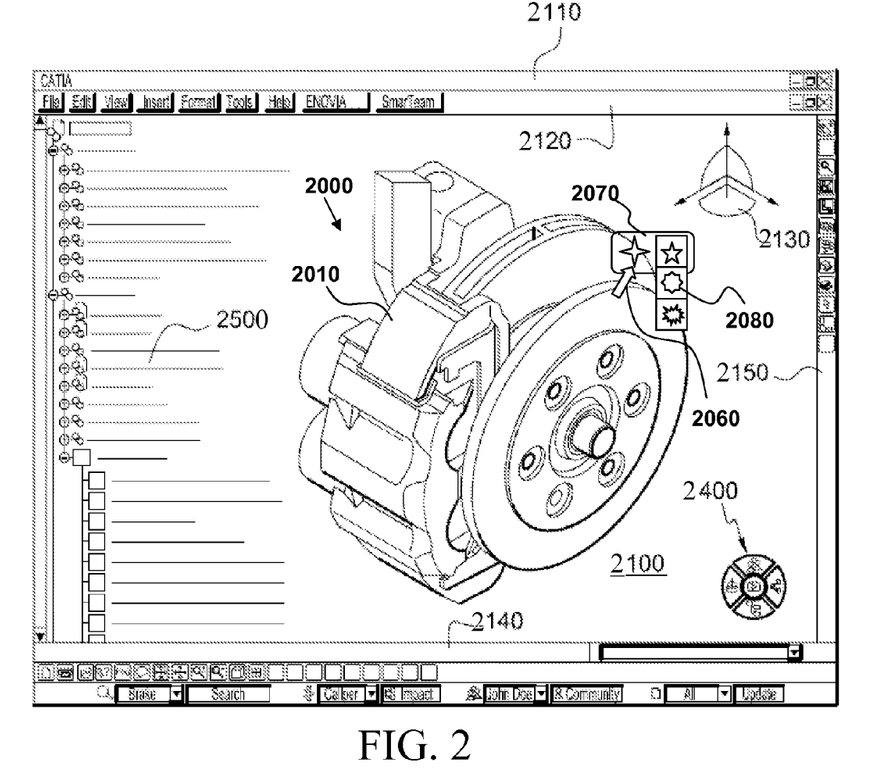
FIG. 2 shows an example of a graphical user interface.

FIG. 2 shows an example of the GUI of a typical CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. a sculpting operation, or any other operation such change the dimension, color, etc.) or edit geometrical constraints by selecting an appropriate icon. For example, typical CAD operations are the modeling of the punching or the folding of the 3D modeled object displayed on the screen.

The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
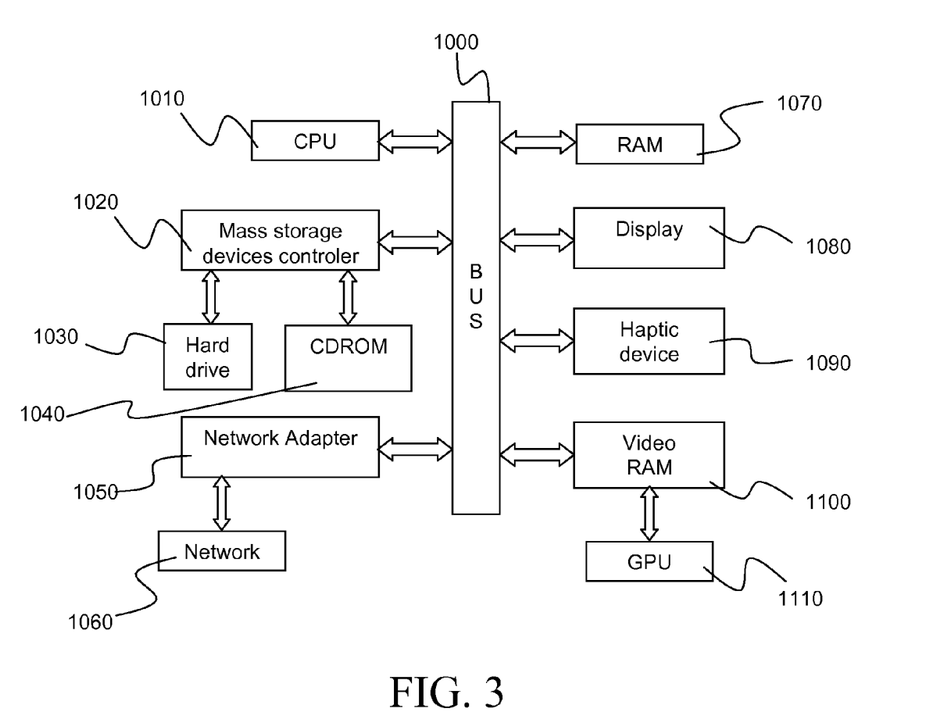
FIG. 3 shows an example of a client computer system.

FIG. 3 shows an example of the architecture of the system as a client computer system, e.g. a workstation of a user.

The client computer comprises a central processing unit (CPU) 1010 connected to an internal communication BUS 1000, a random access memory (RAM) 1070 also connected to the BUS. The client computer is further provided with a graphics processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on screen 1080, as mentioned with reference to FIG. 2. By screen, it is meant any support on which displaying may be performed, such as a computer monitor. In addition, the cursor control device allows the user to select various commands, and input control signals. The cursor control device includes a number of signal generation devices for input control signals to system. Typically, a cursor control device may be a mouse, the button of the mouse being used to generate the signals.

To cause the system to perform the method, it is provided a computer program comprising instructions for execution by a computer, the instructions comprising means for this purpose. The program may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The instructions may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language. The program may be a full installation program, or an update program. In the latter case, the program updates an existing CAD system to a state wherein the system is suitable for performing the method.

The method comprises providing (S10) a modeled volume representing the workpiece and a trajectory of the cutting tool. The modeled volume may be provided using any volume modeling. For example, the modeled volume may be provided as an algebraic formulation. Alternatively, the modeled volume may be provided as a B-Rep (boundary representation, i.e. formulations for the boundary surface(s) of the modeled volume) or as a polyhedron. The modeled volume may also be provided as a set of dexels, as will be discussed later. A representation of the modeled volume, for example 3D, may also be displayed to a user at all times during the method. The trajectory of the cutting tool is any ordered set of positions to be taken by the cutting tool during a machining of the workpiece. A representation, for example 3D, of the cutting tool may also be displayed to the user. The provision of the trajectory may be performed by the user, e.g. by the user handling the representation of the cutting tool on the screen, for example moving the cutting tool toward the displayed modeled volume to simulate cutting the workpiece. The method may update the modeled volume according to the trajectory of the cutting tool. For example, the method may comprise performing the cutting on the modeled volume, and, meanwhile or beforehand, executing the determining (S20) and the testing (S30), e.g. so as to stop the cutting when a collision is detected, e.g. real-time. In such a case, the method may comprise displaying, to the user, information that a collision is detected.

The method also comprises determining (S20) a colliding sweep of the cutting tool. The colliding sweep is data representing the volume swept by the non-cutting front of the cutting tool when the cutting tool follows the trajectory. In general, the cutting tool has a cutting part and a non-cutting part, which may also be called respectively "cutting volume" and "non-cutting volume". The frontier between the cutting part and the non-cutting part may be variable, i.e. there may different frontiers, thereby possibly defining a different pair consisting of the cutting part and the non-cutting part of the cutting tool. The cutting tool may be a milling machine, a drill press, or even a knife. In any case, the cutting tool has a non-cutting part (for example a handle), for example for handling and moving the cutting tool, e.g. by a human worker or a robot. The cutting tool is in fact the rigid assembly of a cutting part and a non-cutting part. The trajectory of the tool is a sequence of positions e.g. defined by the user. The non-cutting part is a part of the cutting tool that does not cut material, and therefore collides with any solid it encounters. The non-cutting front of the cutting tool when the cutting tool follows the trajectory is, at a given position of the cutting tool on the trajectory, the subset of points of the cutting tool that would collide a solid at such position when the cutting tool follows the trajectory (should the solid have been placed at such position before the cutting tool starts to follow the trajectory). Formal formulations of the non-cutting front will be provided later. The volume swept by the non-cutting front is the volume where there is a potential collision (e.g. if the workpiece has at least part of it lying in such swept volume). The colliding sweep is any volume data that represents such volume (possibly the swept volume itself or an approximation thereof). The method thereby allows the determination of a volume of the 3D space that represents collision positions of points of the cutting tool in function of the trajectory.

The method further comprises testing (S30) a collision with the workpiece according to the determining (S20) step (i.e. in function of the colliding sweep that has been determined). The testing (S30) may yield a positive result when it detects a collision (in case of a potential collision) or a negative result inversely. For example, the testing (S30) may comprise determining if there is an intersection between the colliding sweep and the workpiece. The method may thus determine whether or not the (volume represented by the) colliding sweep intersects the workpiece. If so, a collision is detected by the method.

A context of the method is real-time machining simulation using a computer aided design system or a computer aided manufacturing system. The method provides a reliable simulation of machining a workpiece with a cutting tool having a cutting part and a non-cutting part. Indeed, the method detects collisions in a fast manner, with few false negative results (i.e. few possible collisions are missed by the testing (S30)). This is because the trajectory of the cutting tool is taken into account when determining the colliding sweep (S20).

The determining (S20) may comprise partitioning the trajectory into elementary steps. In such case, the determining (S20) and the testing (S30) may be performed for each elementary step. This allows a fast testing (S30), as the colliding sweep is easily determined. Also, this reduces the chances of having a false positive result of the testing (S30). An elementary step of the tool trajectory may be the motion of the tool between two consecutive positions. At each elementary step of the tool trajectory, the volume swept by the faces of non-cutting moving part protected by the cutting part may be subtracted from the volume swept by the non-cutting part. If the result does not intersect the current workpiece, then it may be determined that no clash (i.e. collision) occurs on this elementary move. After this check, the current workpiece may be updated (by cutting a part of the modeled volume according to the elementary move). This results in both a gain of speed and a gain of reliability. Indeed, the method does not need to refine each elementary trajectory step (thus allowing good performance), and reliability does not depend on any numerical precision value. Performance and reliability do not depend on the direction of displacement vector.

The partitioning may depend on a predetermined time step. For example, the method may partition the trajectory into elementary steps, each corresponding of a handling of a representation of the cutting tool by the user during a predetermined time step. Alternatively, the method may partition the trajectory into elementary steps of a predetermined length. Alternatively, the method may partition the trajectory into a predetermined number of elementary steps of equal length.

Alternatively, the method may partition the trajectory into elementary steps each defining a regular trajectory. By regular trajectory, it is meant that, for each given point of the cutting tool, the curve defined by the sequence of positions of the given point (when the cutting tool follows the trajectory) has no cusp (i.e. no singular point). For example the elementary step can be linear, circular, helicoidal arcs (i.e. coil portions) or curves for the description of the kinematic of the sculpting tools. Such a partitioning efficiently reduces the number of false positive at the step of testing (S3).

The cutting tool may be convex, with some boundaries cutting and some other non-cutting. This ensures a more reliable result of the testing (S30).

Figure 4:
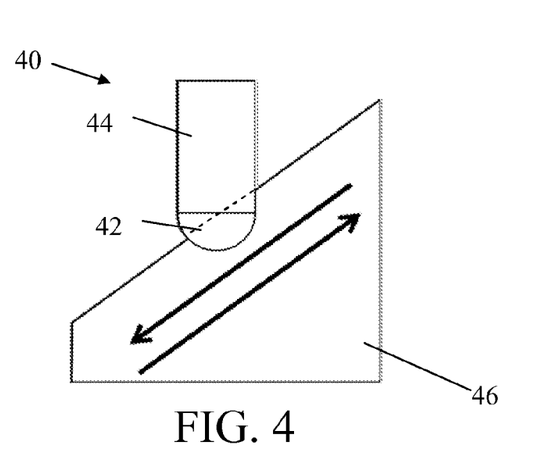
FIGS. 4-21 show examples of the method.

The method dissociates the motion of the cutting part of the tool and the motion of the non-cutting part of the tool while updating the workpiece. This is illustrated with reference to FIGS. 4-6, which show an example of applying the method.

In this example, the method comprises displaying to the user a representation of the cutting tool 40 with a cutting part 42 and a non-cutting part 44, as well as the modeled volume 46 representing the workpiece. On FIG. 4, modeled volume 46 represents the workpiece before update. On FIGS. 5-6, modeled volume 46 represents the workpiece after update.

The cutting part 42 is the hemispherical portion of the tool 40 while the non-cutting part 44 is the cylindrical portion of the tool 40 (e.g. the tool shank). The workpiece before the cutting step is the trapezoidal shape 46 on FIG. 4.

Figure 5:
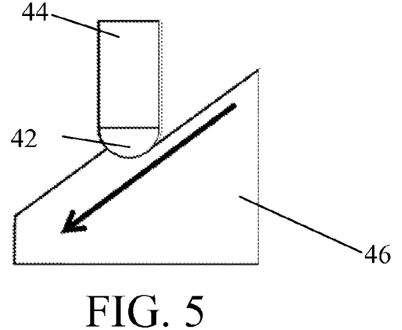

It may be observed that if the tool 40 is descending from top right to bottom left, no collision would occur (in a real machining process) since the cutting front precedes the tool shank as illustrated on FIG. 5. Conversely, ascending from bottom left to top right would produce (in real machining) a collision 48 between the tool shank 44 and the workpiece would occur, since the tool shank precedes the cutting front, as illustrated by FIG. 6.

Figure 6:
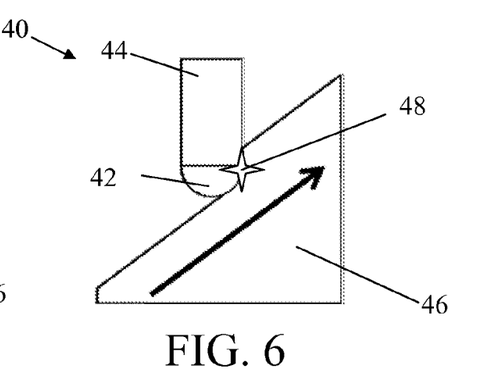
Figure 7:
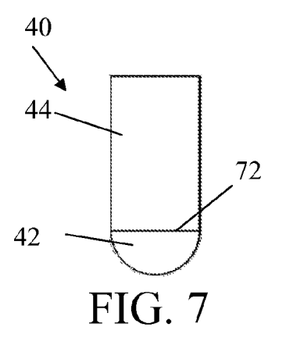

The method is thus designed for predicting this asymmetric behaviour, and efficiently detects a collision in the case of FIG. 6, whereas it efficiently detects no collision in the case of FIG. 5. Furthermore, the trajectory may comprise in such a case a single elementary step. Therefore, the method can quickly perform the testing (S30) for the whole trajectory.

Examples of the method are now discussed with reference to FIGS. 7-21. These examples are combinable with the example discussed with reference to FIGS. 4-6.

The moving cutting tool 40 is decomposed into a cutting volume 42 and a non-cutting volume 44. Note that the internal boundary 72 shared by cutting 42 and non-cutting 44 volumes has no practical significance and does not impact the material removal, or the collision behavior. This boundary 72 surface is thus chosen for convenience of the computation, and may be set arbitrarily. In the case of the example, the boundary 72 is conveniently chosen as a disk.

In a first example, determining the colliding sweep comprises determining the volume swept by the non-cutting front of the cutting tool 40 when the cutting tool 40 follows the trajectory. In other words, the method actually determines the volume swept by the non-cutting front of the cutting tool 40 when the cutting tool 40 follows the trajectory, and the colliding sweep may equal such determined volume.

In the example, the tool 40 is a rigid moving assembly including the cutting volume 42 and the non-cutting volume 44. Let V be the value of the non-cutting volume 44. A naïve approach may consider intersecting the workpiece with the swept volume of V. Defining the trajectory by a function $t \in [0,1] \to \text{Traj}(t)$ where, for each $t \in [0,1]$, Traj(t) is an isometric transformation, the swept volume of V is:

$$\text{Sweep}(V) = \bigcup_{t \in [0,1]} \text{Traj}(t)(V)$$

At each $t \in [0,1]$, the isometric transformation Traj(t) is defined by a rotation Rot(t) and a translation Trans(t), meaning that a point x of the three dimensional space is moved at position Traj(t)(x)=Rot(t)x+Trans(t).

Figure 8:
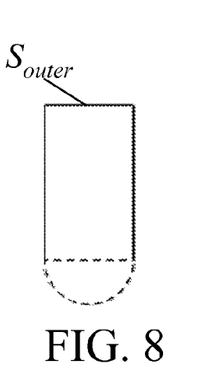
Figure 9:
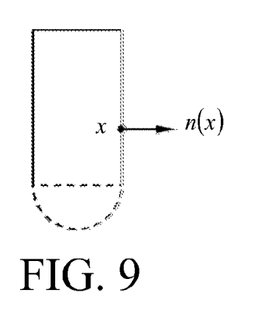

Instead of the naïve swept volume concept, the method considers a more sophisticated definition by using the union of so-called advancing outer fronts. Let $S_{outer}$ be the boundary of the cutting volume 42 which is also the outer boundary of the tool 40, defined in the tool referential. For example on FIG. 7, the tool is decomposed into the cutting volume 42 and the non-cutting volume 44. FIG. 8 illustrates the corresponding $S_{outer}$ boundary as the solid line (the non dotted line). At any point $x \in S_{outer}$, the outer normal vector is noted n(x), as illustrated on FIG. 9.

For a given $t \in [0,1]$, let the non-cutting front of tool 40, denoted by Front(t), be the subset of $S_{outer}$ defined by:

$$\text{Front}(t) = \left\{ x \in S_{outer}; \left\langle Rot(t)n(x), \frac{\partial}{\partial t} Traj(t)x \right\rangle \geq 0 \right\}$$

Where $\langle u, v \rangle$ denotes the scalar product between vectors u and v, and Rot(t) is the rotation component of the trajectory Traj(t). In other words, Front(t) is the set of points of $S_{outer}$ whose instantaneous speed vector at time t is oriented toward the exterior of moving tool 40.

Figure 10:
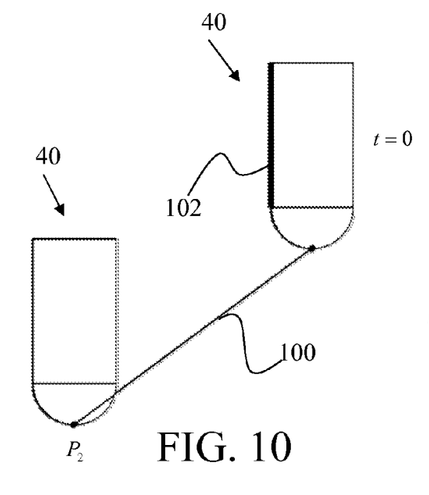

For example, as illustrated on FIG. 10, tool 40 may move along the line segment 100 from point $P_1$ to point $P_2$. Consequently, Traj(t)x=x+t($P_2-P_1$) because Rot(t)=Id for all t. Then $$\frac{\partial}{\partial t}(Traj(t)x) = P_2 - P_1$$

for all t. So, at t=0, Front(t) is the vertical segment 102 illustrated on FIG. 10 by the thick line.

Figure 11:
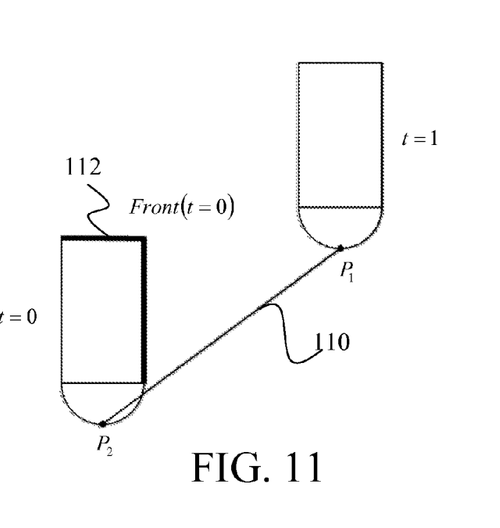

The reverse trajectory 110 from $P_2$ to $P_1$ induces a different Front(t=0), as illustrated on FIG. 11 by the reverse L-shape thick lines 112.

The method may determine (S20) the "colliding sweep" as the volume swept by Front(t):

$$CollidingSweep = \bigcup_{t \in [0,1]} Traj(t)(\text{Front}(t))$$

The method checks the colliding sweep against the current workpiece, as opposed to checking the non-cutting volume sweep against the current workpiece.

Figure 12:
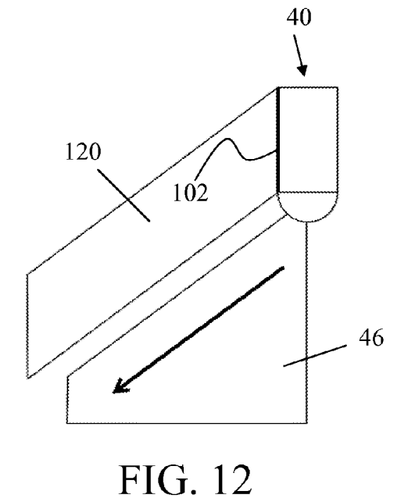

FIG. 12 illustrates the colliding sweep 120 computed according to the descending trajectory. Clearly, the colliding sweep 120 and the modeled volume 46 are separated, meaning that the non-cutting volume of the tool 40 does not clash the modeled volume 46 during this portion of trajectory.

Figure 13:
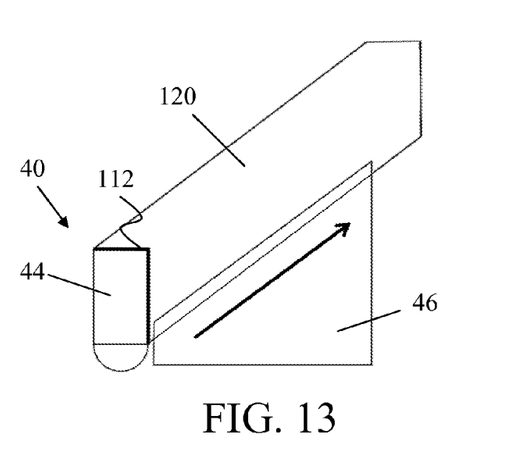

Now, FIG. 13 illustrates the colliding sweep 120 according to the ascending trajectory. Due to the shape of Front (t=0), the colliding sweep 120 is different and overlaps the workpiece 46. This means that the non-cutting volume 44 of the tool 40 actually clashes the modeled volume 46 during this portion of trajectory.

In a second example, the method comprises determining a protective front of the cutting tool. The protective front of the cutting tool is, when the cutting tool follows the trajectory, at a given position of the cutting tool on the trajectory, a subset of points of the cutting tool that prevent other points of the cutting tool from colliding with a solid at such position when the cutting tool follows the trajectory (should the solid have been placed at such position before the cutting tool starts to follow the trajectory). Formal formulations of the protective front will be provided later.

Determining (S20) the colliding sweep may comprise in such a case determining the volume swept by the non-cutting part and the volume swept by the protective front. Then, the method may determine a difference between said two volumes. The testing (S30) may comprise evaluating if said volume difference intersects the modeled volume, and yield a positive result if so, or a negative result otherwise. This allows a fast and robust determining (S20).

Figure 14:
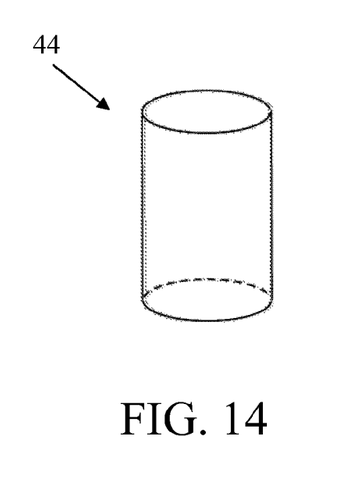
Figure 15:
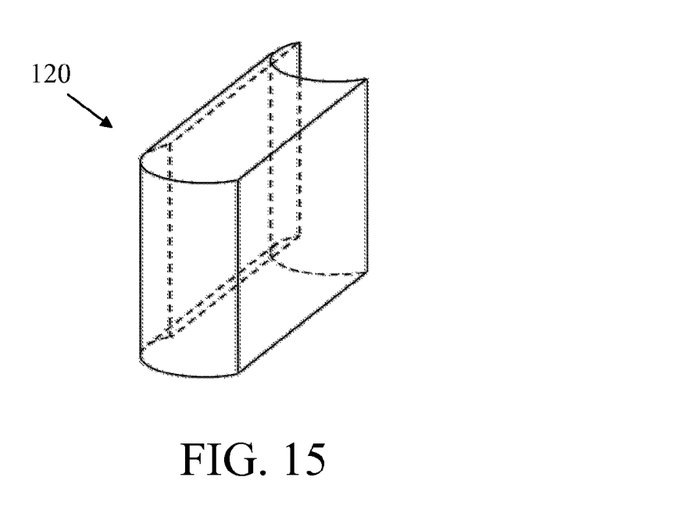
Figure 16:
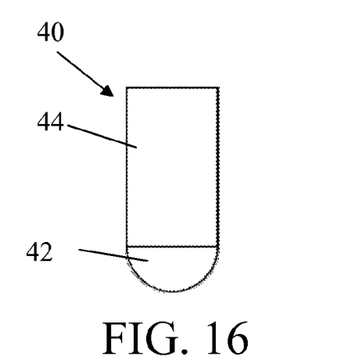
Figure 17:
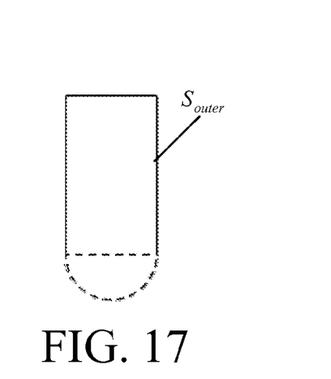
Figure 18:
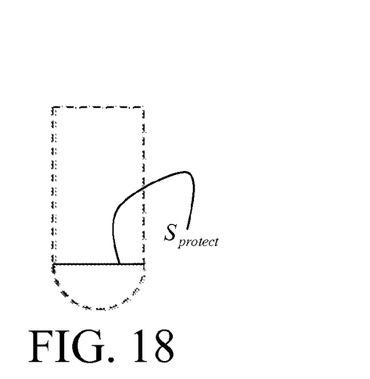

The examples are illustrated in 2D for convenience. The real is however 3-dimensional, as discussed earlier. FIGS. 14-15 provide a 3D illustration of the examples. FIG. 14 shows the non-cutting volume 42 as a circular cylinder (rather than a rectangle). FIG. 15 shows that the colliding sweep 120, being the volume swept by the half cylinder flank along a sloped trajectory, is not convex.

An implementation of the method, in this second example as well as in the first example, may be the multi-dexel model. In other words, the workpiece may be represented by a set of dexels (thereby representing a modeled volume). In other words, the modeled volume is provided as a set of dexels in this example. Each dexel (of the set of dexels) comprises a set of at least one segment. Such segments represent the intersection between a line and the workpiece.

The use of sets of dexels to represent the workpiece allows a light representation (using little memory space). This also allows a representation of the workpiece which may be easily handled. Notably, the cutting may be performed particularly efficiently when the workpiece is represented by a set of dexels, due to the data structure of a set of dexels. Indeed, design operations may be performed with high responsiveness and high robustness. Notably, operations on a set of dexels may be performed through parallel processing, on a line-by-line basis, so as to gain in efficiency. Therefore, the processor of the system may efficiently be the GPU.

The term "dexel" is known to be a shortcut for "depth element" (just as the term "pixel" is a shortcut for "picture element"). The notion of dexel has been mentioned in a large number of research papers. In the context of the method, a dexel comprises a set of at least one segment, i.e. a pair of 3D points. In an example, the modeled volume comprises at least one dexel which comprises a set of at least two segments (e.g. the initial set of dexels and/or the new set of dexels comprise(s) at least two segments). The segments of a dexel, if several, may be ordered (in such a case the dexel is a list), or unordered. The segments of a dexel represent the intersection between a line and the workpiece. In other words, considering virtual lines intersecting with the workpiece, a dexel is the set of the segments originating from a given line and that results from the computation of the intersection.

It is important to note that the sets of dexels are provided as computer-implemented data. Thus, the definitions provided above and below regarding any representation of the modeled volume have implications from a data structure point of view. For example, a segment may be provided as a pair of 3D positions (e.g. two 3D positions linked to each other). A 3D position may itself be provided as a list of three coordinates (e.g. floating points), associated to a referential 3D frame. A dexel is a set of segments, which implies that segments are linked together in a set structure. The dexels of a set of dexels may as well be linked together. Representing the modeled volume by a set of dexels, which themselves comprise a set of at least one segment, allows a fast testing (S30), as well as fast ulterior updating of the modeled volume.

Testing (S30) the collision may comprise, for a respective dexel, determining the segments of the respective dexel that intersect the volume swept by the protective front, updating the respective dexel accordingly (i.e. in function of the determined segments, i.e. by shortening and/or discarding determined dexels), and evaluating if the segments of the respective dexel as updated intersect the volume swept by the non-cutting part. Then, the method may yield a positive result of the testing if the evaluation is positive, or a negative result if the evaluation is negative.

The method may comprise defining a protective front and a non-cutting part (e.g., as explained earlier, the protective front may be defined arbitrarily, and may divide the cutting tool into the cutting part and the non-cutting part) so that the volume swept by the protective front and the volume swept by the non cutting part are convex. The one skilled in the art will understand how to make such division, so as to obtain convex parts. In such a case, determining the segments of the respective dexel that intersect the volume swept by the protective front and evaluating if the segments of the respective dexel as updated intersect the volume swept by the non-cutting part are performed particularly fast.

Indeed, the segments of the respective dexel may typically be ordered (an actual order may exist in the data defining the dexel, or such order be retrieved as it exists naturally). The non-cutting part may sweep a convex volume, for example if the non-cutting part is convex and the elementary step is a straight translation. Additionally, the protective front may sweep a convex volume as well. For example, the cutting part may be convex as well. The trajectory may be divided into elementary steps consisting of straight translations. Updating the respective dexel may comprise shortening the segment of minimal order that intersects the volume swept by the protective front (e.g. the first segment that intersects the volume swept by the protective front when the order of the segments of the respective dexel is gone through), shortening the segment of maximal order that intersects the volume swept by the protective front (e.g. the last segment that intersects the volume swept by the protective front when the order of the segments of the respective dexel is gone through), and removing all segments between the segment of minimal order and the segment of maximal order.

This second example of the method is now discussed with reference to FIGS. 16-21.

In the context of using dexels, it may be more efficient, from a processing point of view, to manage a convex colliding sweep or, if not possible, a solid defined by the subtraction of two convex sets. Indeed, the intersection of a segment with a set S difference of two convex sets, $S=C_1-C_2$ can be carried on as follows.

The method may first intersect the line L supporting the segment with $C_1$ and $C_2$, which gives two possibly empty segments $I_1=L \cap C_1$ and $I_2=L \cap C_2$. It may be observed that $L \cap S = L \cap (C_1-C_2) = (L \cap C_1)-(L \cap C_2) = I_1-I_2$. Of course segments supported by the line L can be expressed as interval in the parametric expression of L. The intersection of a segment supported by L with S then boils down into the intersection of an interval with the difference of two intervals, the later being, in the worst case, the union of two intervals.

For this reason, the first example previously presented may be reformulated in order to make the method more practical, in particular in the context of a dexel model. Consider a convex non-cutting volume V. We call $S_{protect}$, the boundary of V which is not in $S_{outer}$. In other words, $S_{protect}$ includes the faces of V which are in contact with other cutting or non-cutting volumes of the tool.

In practical situations such as NC machining simulation, the shape of most common tools allows $S_{protect}$ to include one or two planar faces. However, it is noted that the internal separation between the cutting and non-cutting volumes has no physical significance and can therefore often be chosen as planar without any impact on the resulting behavior.

In the case of the example of FIGS. 4-15, $S_{protect}$ may be a disk. As illustrated on FIGS. 16-18, $S_{protect}$ is the solid line separating the cutting volume and the non-cutting volume.

The method may define the colliding sweep as the set theoretic difference between the sweep of the whole convex non-cutting volume and the sweep of a subset of $S_{protect}$. This subset includes all points of $S_{protect}$ where the outer normal points in the sweep direction. In case of a general, non translational trajectory, some part of $S_{protect}$ may have an outer normal pointing toward the instantaneous sweep speed and some not. In this case only a subset of $S_{protect}$ may be swept. In case of translational sweeps, this is the subtraction of two convex sets and can be easily managed in a multi-dexel model.

Formally, the method may define:

$$protectFront(t) = \left\{ x \in S_{protect}; \left\langle Rot(t)n(x), \frac{\partial}{\partial t} Traj(t)x \right\rangle \geq 0 \right\}$$

So that, according to the previous definition of colliding sweep, we have:

$$CollidingSweep = \left( \bigcup_{t \in [0,1]} Traj(t)(V) \right) - \left( \bigcup_{t \in [0,1]} Traj(t)(protectFront(t)) \right)$$

In the context of machining simulation using a multi-dexel grid representation, the method can therefore easily check collision during an elementary trajectory by the following operations.

Figure 19:
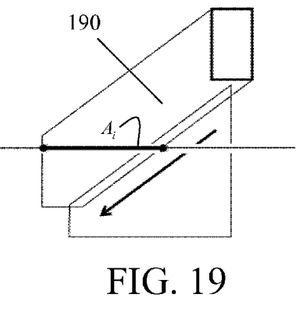
Figure 20:
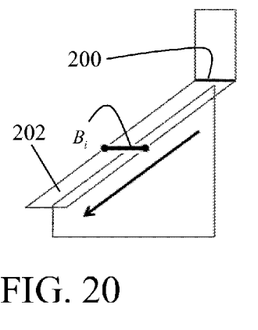
Figure 21:
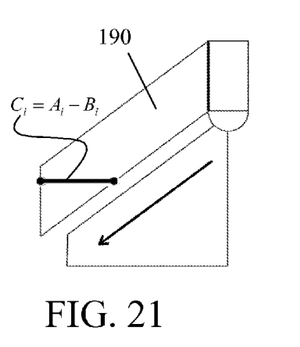

For each dexel, the method may compute the intervals $A_i$ (i.e. the segments of the dexel, which are stored as intervals on the support line of the dexel in this example) given by the intersection with the sweep of the non-cutting volume 190, as illustrated on FIG. 19. If all these intervals $A_i$ have an empty intersection with the current workpiece, then one can be sure that no collision occurs, i.e. the testing (S30) may yield a negative result.

Else, the method may compute the volume swept by protectFront from t=0 to t=1 (if the trajectory, or the elementary step, is defined with a parameterization t going from 0 to 1). For this, the method may collect the faces 200 of $S_{protect}$ the outer normal of which has a positive dot product with the displacement vector. The method may then compute the volume that is swept by these faces 200, as illustrated on FIG. 20. The method may finally compute the intervals $B_i$ equal to the intersection between the dexel and this swept volume 202, as illustrated on FIG. 20. The method may compute the Boolean one-dimensional subtraction $C_i = A_i - B_i$: these resulting intervals represent the intersection between the dexel and the colliding sweep volume 190, as illustrated on FIG. 21. If these $C_i$ intervals have a non empty intersection with the dexel intervals storing the workpiece layer, one can conclude that a collision will occur on that dexel. One can also deduce the collision depth. Else, no collision occurs on that dexel, as illustrated on FIG. 21.

The invention claimed is:

1. A computer-implemented method for simulating the machining of a workpiece on a CAM system, wherein the method comprises:
    by a processor and associated memory:
    providing in the CAM system (i) a modeled volume representing a subject workpiece, (ii) a cutting tool having a cutting part and a non-cutting part, the non-cutting part having a non-cutting front, and (iii) a trajectory of the cutting tool;
    determining a colliding sweep of the cutting tool, wherein the colliding sweep represents volume swept by the non-cutting front of the cutting tool when the cutting tool follows the trajectory, and wherein determining the colliding sweep comprises dissociating motion of the cutting part and motion of the non-cutting part, and the dissociating motion includes determining volume swept by the non-cutting front when the cutting tool is moving to follow the trajectory at a given time t, wherein the non-cutting front comprises a set of points with instantaneous speed vectors at the given time t that are oriented towards an exterior of the moving cutting tool, wherein at the given time t, the non-cutting front Front(t) is a subset of $S_{outer}$ defined by:

Front(t)={x∈$S_{outer}$;⟨Rot(t)n(x),∂/∂tTraj(t)x⟩ ≥0}, wherein $S_{outer}$ is a boundary of the cutting part, ⟨u,v⟩ denotes a scalar product between vectors u and v, Traj(t) denotes a trajectory of the cutting tool at the given time t, and Rot(t) denotes a rotation component of the trajectory at the given time t; and
    testing a collision with the subject workpiece resulting from the determined colliding sweep, the testing comprising: determining whether the colliding sweep intersects the workpiece, and if the colliding sweep is determined as intersecting the workpiece, detecting a collision.

2. The method of claim 1 wherein the method further comprises determining a protective front of the cutting tool; and
    wherein determining the colliding sweep comprises determining both volume swept by the non-cutting part and volume swept by the determined protective front.

3. The method of claim 2, wherein the subject workpiece is represented by a set of dexels, each dexel comprising a set of segments representing the intersection between a line and the subject workpiece, and wherein testing the collision comprises, for a respective dexel:
    determining segments of the set of segments of the respective dexel that intersect the volume swept by the determined protective front,
    updating the respective dexel based on the determined segments, and
    evaluating if the determined segments as updated intersect the volume swept by the non-cutting part.

4. The method of claim 3, wherein the cutting part is convex, the determined segments are ordered, and updating the respective dexel comprises:
    shortening a segment of minimal order that intersects the volume swept by the determined protective front,
    shortening a segment of maximal order that intersects the volume swept by the determined protective front, and
    removing all segments between the segment of minimal order and the segment of maximal order.

5. A CAM system for simulating machining of a workpiece comprising:

a processor coupled with memory to simulate machining of a subject workpiece with a cutting tool having a cutting part and a non-cutting part, the non-cutting part having a non-cutting front, the processor configured to:

provide a modeled volume representing (i) the subject workpiece and (ii) a trajectory of the cutting tool;

determine a colliding sweep of the cutting tool, wherein the colliding sweep represents volume swept by the non-cutting front of the cutting tool when the cutting tool follows the trajectory, and wherein determining the colliding sweep comprises dissociating motion of the cutting part and motion of the non-cutting part, the dissociating motion includes determining volume swept by the non-cutting front when the cutting tool is moving to follow the trajectory at a given time t, wherein the non-cutting front comprises a set of points with instantaneous speed vectors at the given time t that are oriented towards an exterior of the moving cutting tool, wherein at the given time t, the non-cutting front Front(t) is a subset of $S_{outer}$ defined by:

Front(t)={x∈$S_{outer}$;⟨Rot(t)n(x),∂/∂tTraj(t)x⟩ ≥0}, wherein $S_{outer}$ is a boundary of the cutting part, ⟨u,v⟩ denotes a scalar product between vectors u and v Traj(t) denotes a trajectory of the cutting tool at the given time t, and Rot(t) denotes a rotation component of the trajectory at the given time t;

test a collision with the workpiece resulting from the determined colliding sweep, the testing comprising: determining whether the colliding sweep intersects the workpiece, and if the colliding sweep is determined as intersecting the workpiece, detecting a collision; and a graphical user interface coupled with the processor, the graphical user interface configured to request the processor to simulate machining of the subject workpiece.

6. The system of claim 5, wherein the processor is a GPU (Graphical Processing Unit).

7. A computer program product, comprising:

a non-transitory computer readable storage medium, the computer readable storage medium having instructions configured for simulating the machining of a subject workpiece with a cutting tool having a cutting part and a non-cutting part by:

providing a modeled volume representing (i) the subject workpiece and (ii) a trajectory of the cutting tool, the non-cutting part of the cutting tool having a non-cutting front;

determining a colliding sweep of the cutting tool, wherein the colliding sweep represents volume swept by the non-cutting front of the cutting tool when the cutting tool follows the trajectory, and wherein determining the colliding sweep comprises dissociating motion of the cutting part and motion of the non-cutting part, the dissociating motion includes determining volume swept by the non-cutting front when the cutting tool is moving to follow the trajectory at a given time t, wherein the non-cutting front comprises a set of points with instantaneous speed vectors at the given time t that are oriented towards an exterior of the moving cutting tool, wherein at the given time t, the non-cutting front Front(t) is a subset of $S_{outer}$ defined by:

Front(t)={x∈$S_{outer}$;⟨Rot(t)n(x),∂/∂tTraj(t)x⟩ ≥0}, wherein $S_{outer}$ is a boundary of the cutting part, ⟨u,v⟩ denotes a scalar product between vectors u and v Traj(t) denotes a trajectory of the cutting tool at the given time t, and Rot(t) denotes a rotation component of the trajectory at the given time t; and testing a collision with the subject workpiece resulting from the determined colliding sweep, the testing comprising: determining whether the colliding sweep intersects the workpiece, and if the colliding sweep is determined as intersecting the workpiece, detecting a collision.

8. A computer-implemented method for simulating the machining of a workpiece on a CAM system, wherein the method comprises:

by a processor and associated memory:

providing in the CAM system (i) a modeled volume representing a subject workpiece, (ii) a cutting tool having a cutting part, a non-cutting part, and a protective front, and (iii) a trajectory of the cutting tool;

determining a colliding sweep of the cutting tool, wherein determining the colliding sweep comprises dissociating motion of the cutting part and motion of the non-cutting part, and the dissociating motion includes determining volume swept by the protective front when the cutting tool is moving to follow the trajectory, wherein the protective front comprises a set of points of the moving cutting tool that prevents other points of the moving cutting tool from colliding with a solid at a position on the trajectory, wherein at a given time t, the protective front protectFront(t) is a subset of $S_{protect}$ defined by: protectFront(t)={x∈$S_{protect}$;⟨Rot(t)n(x), ∂/∂tTraj(t)x⟩ ≥0}, wherein $S_{protect}$ is a boundary of the protective front which is not in a boundary of the cutting part, ⟨u,v⟩ denotes a scalar product between vectors u and v Traj(t) denotes a trajectory of the cutting tool at the given time t, and Rot(t) denotes a rotation component of the trajectory at the given time t; and testing a collision with the subject workpiece resulting from the determined colliding sweep, the testing comprising: determining whether the colliding sweep intersects the workpiece, and if the colliding sweep is determined as intersecting the workpiece, detecting a collision.

9. The method of claim 8, wherein determining the colliding sweep further comprises determining volume swept by the non-cutting part.

10. The method of claim 9, wherein the subject workpiece is represented by a set of dexels, each dexel comprising a set of segments representing the intersection between a line and the subject workpiece, and wherein testing the collision comprises, for a respective dexel:

determining segments of the set of segments of the respective dexel that intersect the volume swept by the protective front, updating the respective dexel based on the determined segments, and evaluating if the determined segments as updated intersect the volume swept by the non-cutting part.

11. The method of claim 10, wherein the cutting part is convex, the determined segments are ordered, and updating the respective dexel comprises:

shortening a segment of minimal order that intersects the volume swept by the protective front, shortening a segment of maximal order that intersects the volume swept by the protective front, and removing all segments between the segment of minimal order and the segment of maximal order.

12. A CAM system for simulating machining of a workpiece comprising:
   a processor coupled with memory to simulate machining of a subject workpiece with a cutting tool having a cutting part, a non-cutting part, and a protective front, the processor configured to:
   provide a modeled volume representing (i) the subject workpiece and (ii) a trajectory of the cutting tool;
   determine a colliding sweep of the cutting tool, wherein determining the colliding sweep comprises dissociating motion of the cutting part and motion of the non-cutting part, and the dissociating motion includes determining volume swept by the protective front when the cutting tool is moving to follow the trajectory, wherein the protective front comprises a set of points of the moving cutting tool that prevents other points of the moving cutting tool from colliding with a solid at a position on the trajectory, wherein at a given time t, the protective front protectFront(t) is a subset of $S_{protect}$ defined by:
   protectFront(t)={$x \in S_{protect}$;⟨Rot(t)n(x),∂/∂tTraj(t)x⟩≥0},
   wherein $S_{protect}$ is a boundary of the protective front which is not in a boundary of the cutting part,
   ⟨u,v⟩ denotes a scalar product between vectors u and v Traj(t) denotes a trajectory of the cutting tool at the given time t, and Rot(t) denotes a rotation component of the trajectory at the given time t; and
   test a collision with the workpiece resulting from the determined colliding sweep, the testing comprising: determining whether the colliding sweep intersects the workpiece, and if the colliding sweep is determined as intersecting the workpiece, detecting a collision; and
   a graphical user interface coupled with the processor, the graphical user interface configured to request the processor to simulate machining of the subject workpiece.

13. The system of claim 12, wherein the processor is a GPU (Graphical Processing Unit).

14. The system of claim 12, wherein the processor is further configured to determine the colliding sweep including determining volume swept by the non-cutting part.

15. The system of claim 14, wherein the subject workpiece is represented by a set of dexels, each dexel comprising a set of segments representing the intersection between a line and the subject workpiece, and the processor is further configured to test the collision for a respective dexel, by:
   determining segments of the set of segments of the respective dexel that intersect the volume swept by the protective front,
   updating the respective dexel based on the determined segments, and
   evaluating if the determined segments as updated intersect the volume swept by the non-cutting part.

16. The system of claim 15, wherein the cutting part is convex, the determined segments are ordered, and updating the respective dexel comprises:
   shortening a segment of minimal order that intersects the volume swept by the protective front,
   shortening a segment of maximal order that intersects the volume swept by the protective front, and p1 removing all segments between the segment of minimal order and the segment of maximal order.

17. A computer program product, comprising:
   a non-transitory computer readable storage medium, the computer readable storage medium having instructions configured for simulating the machining of a subject workpiece with a cutting tool having a cutting part and a non-cutting part by:
   providing a modeled volume representing (i) the subject workpiece and (ii) a trajectory of the cutting tool, the cutting tool having a protective front;
   determining a colliding sweep of the cutting tool, wherein determining the colliding sweep comprises dissociating motion of the cutting part and motion of the non-cutting part, and the dissociating motion includes determining volume swept by the protective front when the cutting tool is moving to follow the trajectory, wherein the protective front comprises a set of points of the moving cutting tool that prevents other points of the moving cutting tool from colliding with a solid at a position on the trajectory, wherein at a given time t, the protective front protectFront(t) is a subset of $S_{protect}$ defined by: protectFront(t)={$x \in S_{protect}$;⟨Rot(t)n(x),∂/∂tTraj(t)x⟩≥0}, wherein $S_{protect}$ is a boundary of the protective front which is not in a boundary of the cutting part, ⟨u,v⟩ denotes a scalar product between vectors u and v, Traj(t) denotes a trajectory of the cutting tool at the given time t, and Rot(t) denotes a rotation component of the trajectory at the given time t; and
   testing a collision with the subject workpiece resulting from the determined colliding sweep, the testing comprising: determining whether the colliding sweep intersects the workpiece, and if the colliding sweep is determined as intersecting the workpiece, detecting a collision.

* * * * *

UNITED STATES PATENT AND TRADEMARK OFFICE
CERTIFICATE OF CORRECTION

| | | |
|---|---|---|
| PATENT NO. | : 9,524,583 B2 | |
| APPLICATION NO. | : 13/666558 | |
| DATED | : December 20, 2016 | |
| INVENTOR(S) | : Nicolas Montana et al. | |

It is certified that error appears in the above-identified patent and that said Letters Patent is hereby corrected as shown below:

In the Claims

In Column 18, Claim 16, Line 11, please delete "p1" after "and".

Signed and Sealed this
Ninth Day of May, 2017

Michelle K. Lee
*Director of the United States Patent and Trademark Office*